June 27, 1933.  W. T. BARKER  1,915,397
FURNACE
Filed Dec. 5, 1927   5 Sheets-Sheet 1

INVENTOR
Ward T. Barker.
BY
ATTORNEY

June 27, 1933.  W. T. BARKER  1,915,397
FURNACE
Filed Dec. 5, 1927  5 Sheets-Sheet 3

INVENTOR
*Ward T. Barker*
BY
ATTORNEY

June 27, 1933.   W. T. BARKER   1,915,397
FURNACE
Filed Dec. 5, 1927   5 Sheets-Sheet 4
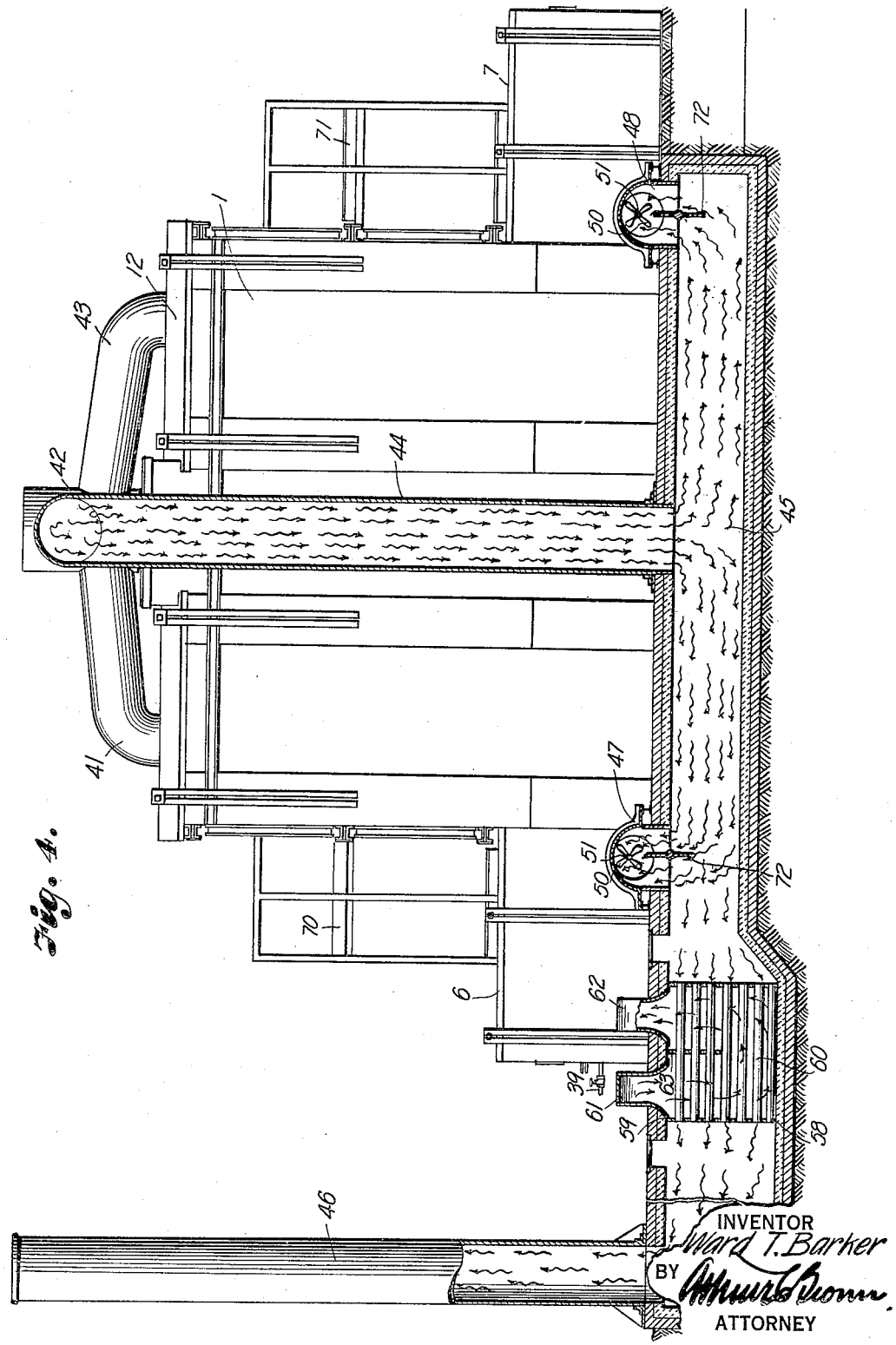

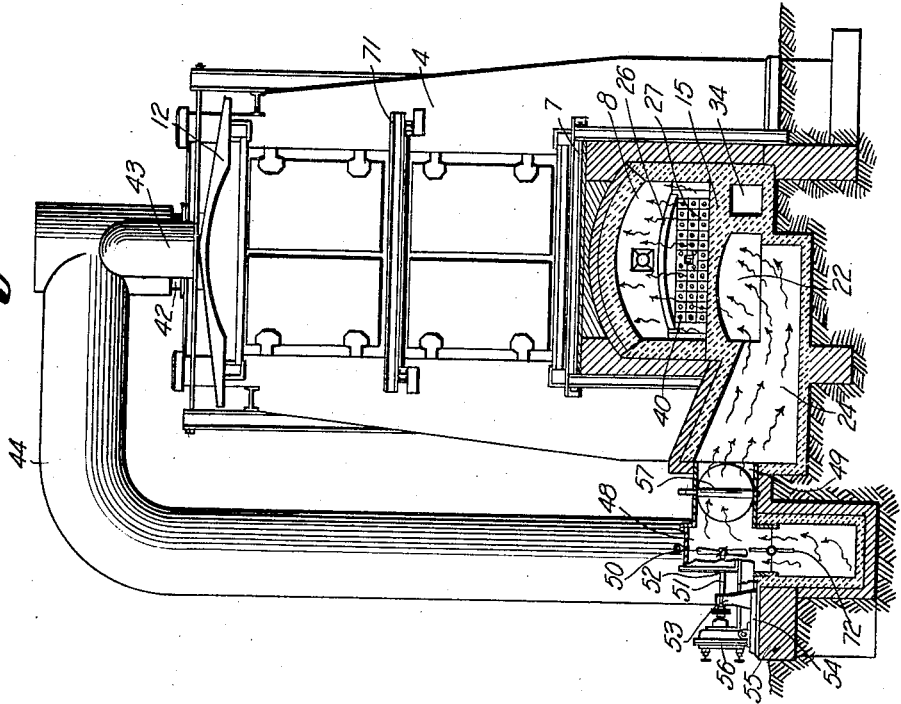
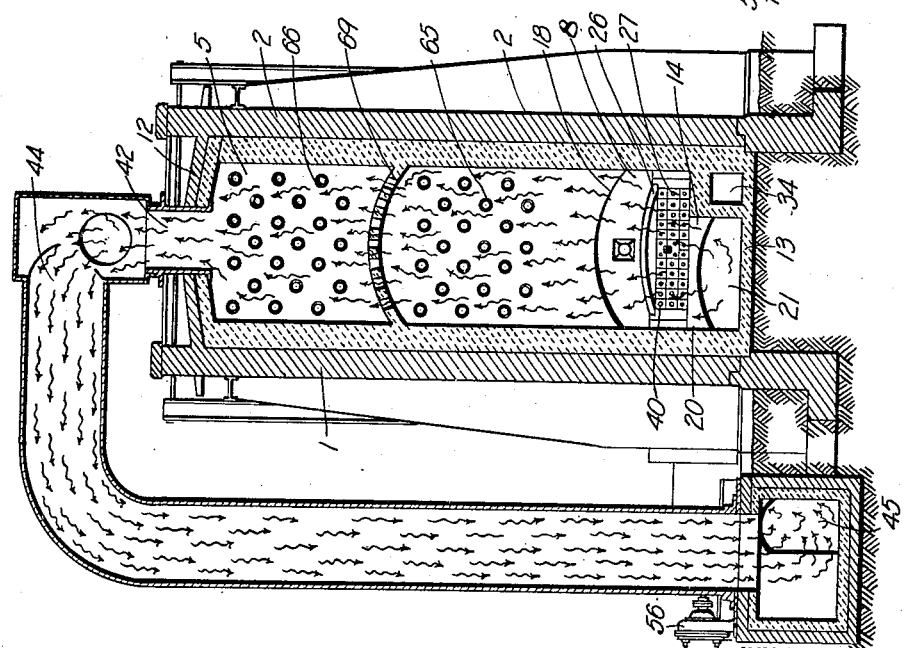

Patented June 27, 1933

1,915,397

UNITED STATES PATENT OFFICE

WARD T. BARKER, OF KANSAS CITY, MISSOURI, ASSIGNOR TO B. P. LIENTZ MANUFACTURING COMPANY, OF KANSAS CITY, MISSOURI, A CORPORATION OF DELAWARE

FURNACE

Application filed December 5, 1927. Serial No. 237,790.

My invention relates to furnaces and more particularly to structures of that character for use in connection with oil stills, the principal object of the invention being to recirculate hot spent gases through the heating chamber in such a manner and in such combination with fresh products of combustion as to maintain the proper temperature for vaporizing contents of the still, provide the requisite volume of heating medium for economical use of fuel, and prevent the passage of an excessive proportion of oxygen to the heating chamber to deleteriously affect the structural elements.

In accomplishing these and other objects of the invention I have provided improved details of structure, the preferred forms of which are illustrated in the accompanying drawings, wherein:

Fig. 4 is a vertical section through spent gas conduits.

Fig. 5 is a vertical longitudinal section on the irregular line 5—5, Fig. 2.

Fig. 6 is a vertical, longitudinal section on the line 6—6, Fig. 2.

Figure 1:
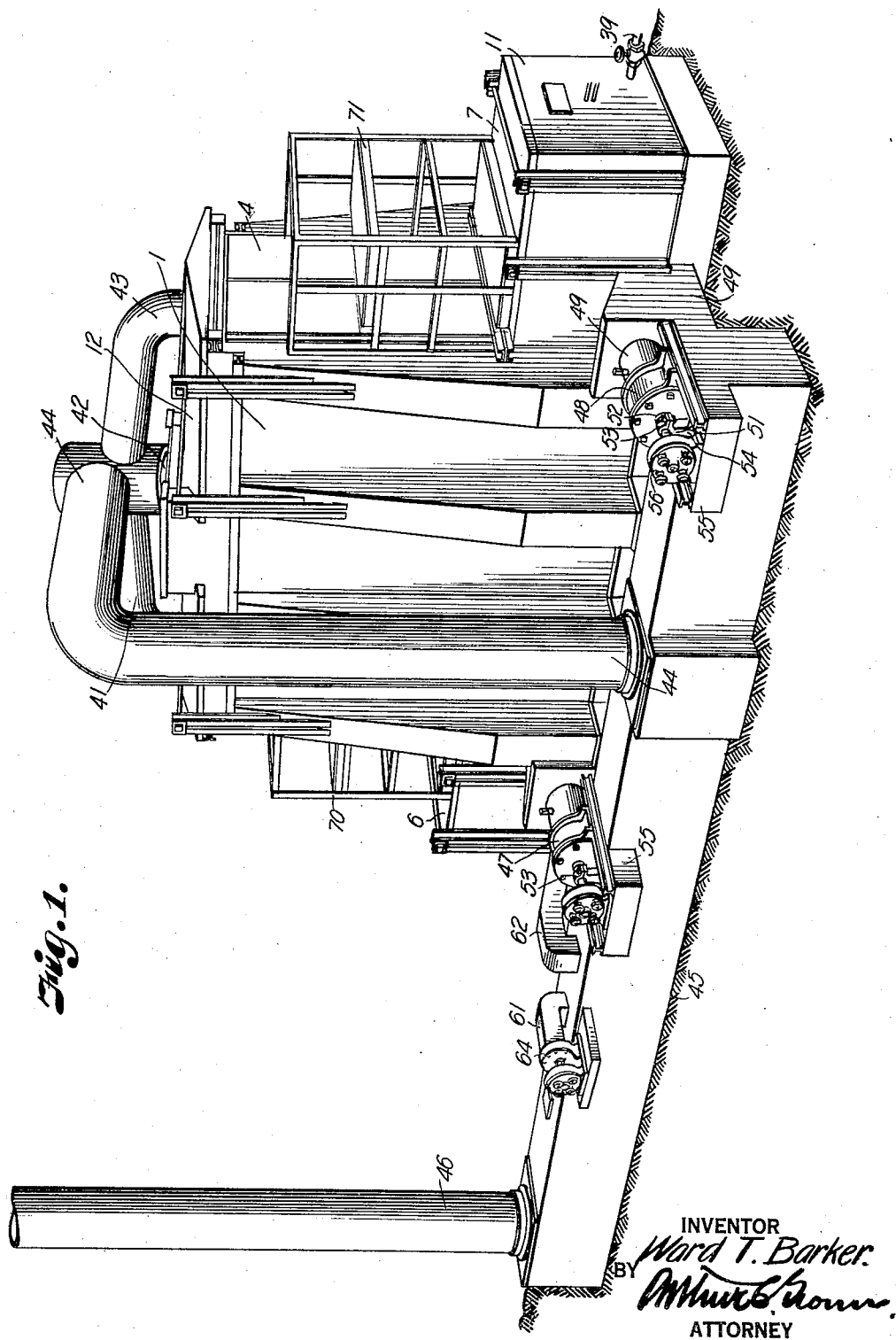
Fig. 1 is a perspective exterior view of a furnace embodying my improvements.
Figure 2:
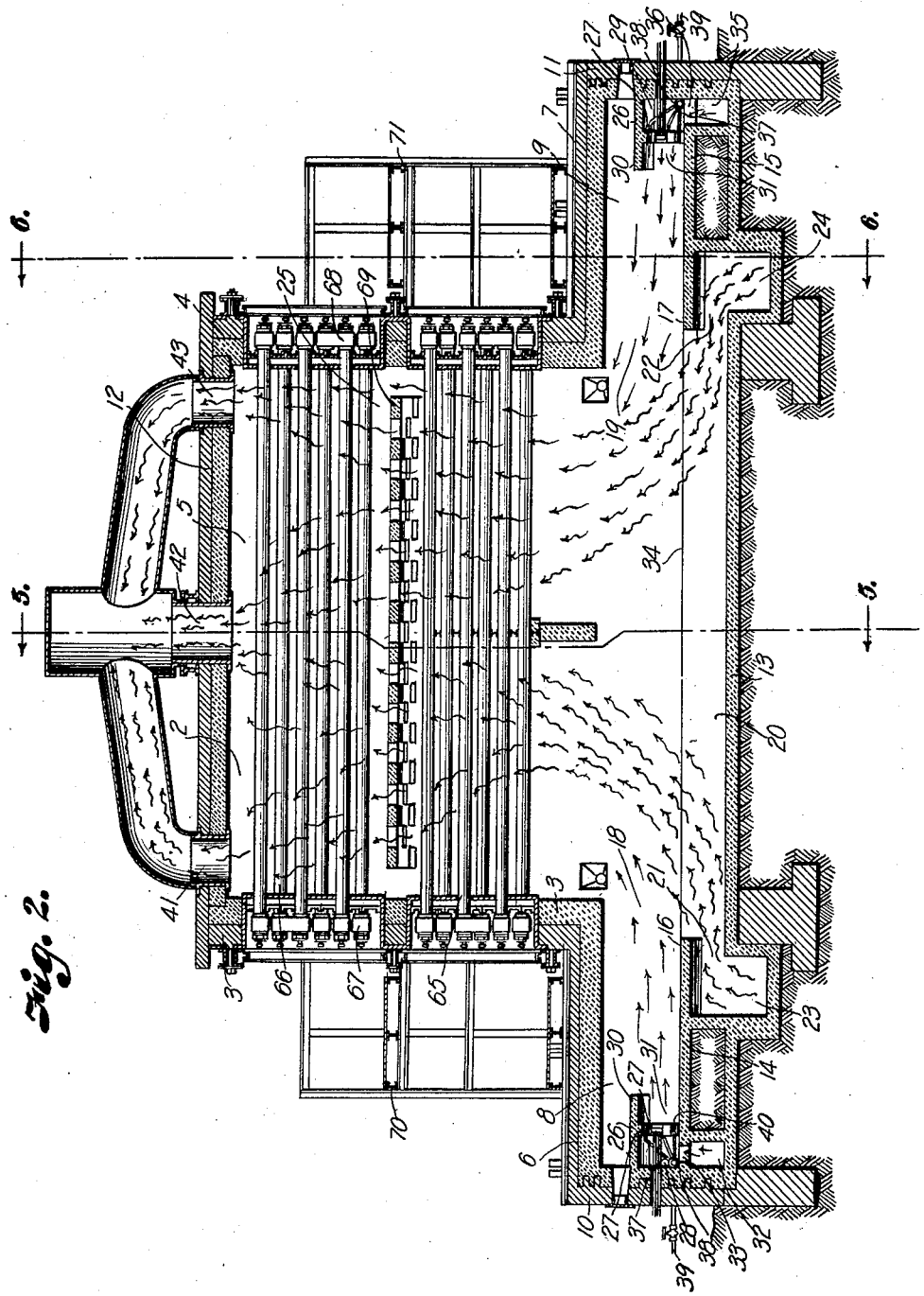
Fig. 2 is a central vertical section through the furnace showing the heating and combustion chambers and associated elements.

Referring in detail to the drawings:

1 and 2 designate the side walls of a furnace embodying my improvements; 3 and 4 are end walls enclosing a central chamber 5 and externally offset to provide roof members 6 and 7 of combustion chambers 8 and 9 at each end of the furnace, the end walls of the combustion chambers being designated 10 and 11. The side walls 1 and 2 are suitably conformed to the L's comprising the combustion chambers.

A roof structure 12 covers the central chamber 5, and a floor 13 thereof is lower than the chamber. Floors 14 and 15 of the combustion chambers are positioned with their inner ends 16 and 17 spaced longitudinally from the inner ends of the respective chamber roofs, providing openings 18 and 19 between the inner ends of the floors and roofs of the respective combustion chambers for means of communication between the combustion chambers and lower portion 20 of the central chamber. The inner ends of the floors 14 and 15 are spaced vertically from the outer ends of the chamber floor 13, thus providing similar throats 21 and 22, one at each end of the central chamber 5, for communication of spent gas return channels 23 and 24 extending outwardly from and preferably at right angles to the side wall 1, and which will be more particularly described, with the lower portion 20 of the chamber 5. The said spent gas inlets or throats 21 and 22 are, therefore, respectively below and adjacent openings 18 and 19 between the combustion chambers and the central chamber, the inner end portions 16 and 17 of the floors of the combustion chambers constituting portions of the roofs of said spent gas channels. The portion of the furnace between the horizontally and oppositely directed openings 18 and 19 of the combustion chambers, being the lower portion 20 of the central chamber, constitutes a mingling chamber where spent gases mingle with fresh products of combustion before passing to an upper still portion 25 of the central chamber 5.

Located at the outer ends of the combustion chambers 8 and 9 are arches 26 extending transversely across the chambers and supported from the floors 14 and 15 by checkered walls 27 to provide air chambers 28 and 29 between the checkered walls and the end walls of the combustion chambers 8 and 9 respectively, the arches extending inwardly of the combustion chambers to form hood elements 30 which help to form mixing chambers 31 opening to the combustion chambers.

Figure 3:
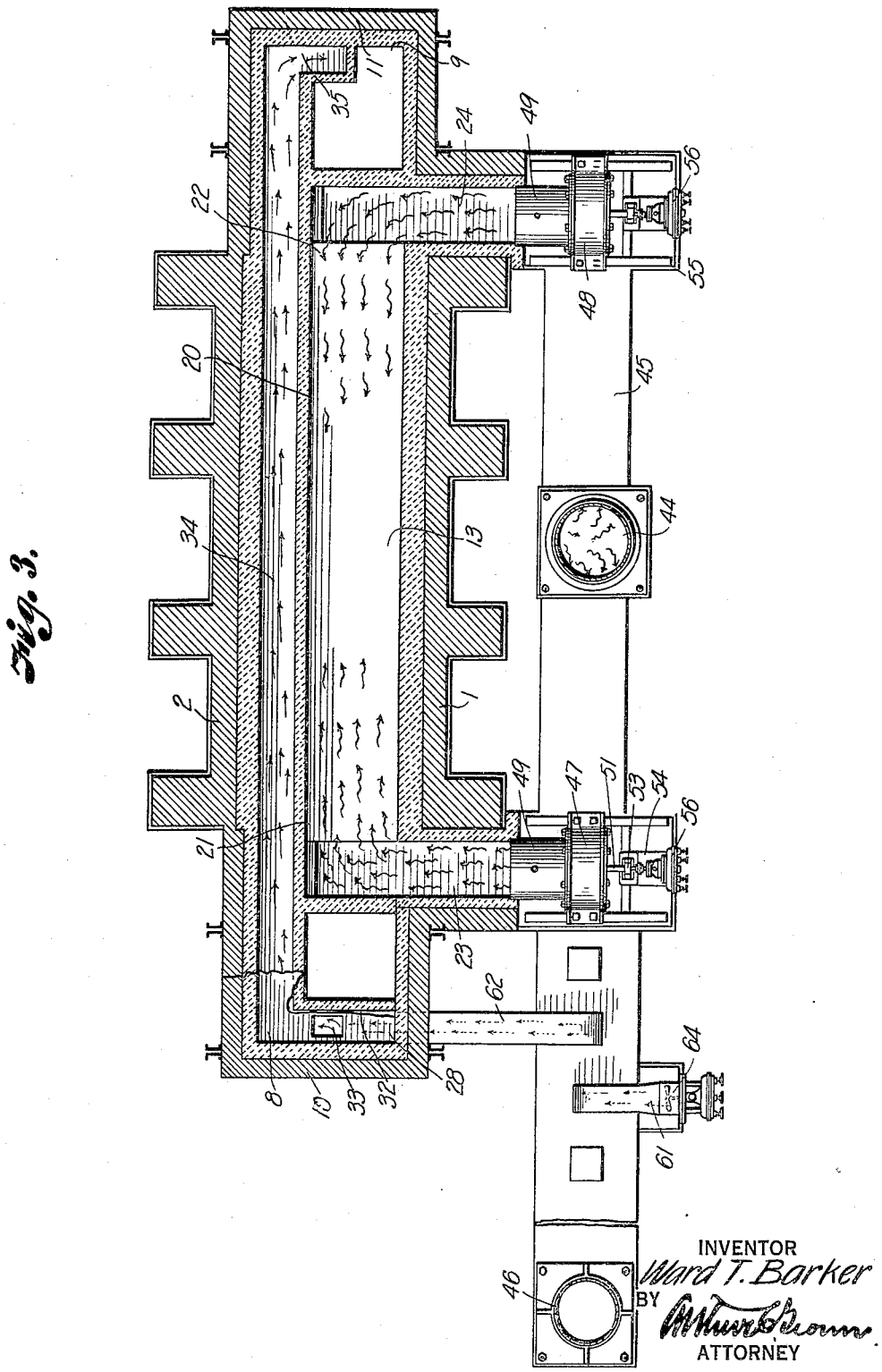
Fig. 3 is a horizontal section through the combustion chambers.

Extending transversely below the air chamber 28 which is associated with the combustion chamber 8, and adjacent the end wall 10, is a passageway 32 communicating with the chamber 28 through a port 33 in the floor 14. Communicating with said passageway 32 and extending longitudinally within the furnace along the side wall 2 is an air tunnel 34 (Figs. 3, 5 and 6) having a lateral branch 35 extending adjacent the end wall 11 below the chamber 29 and communicating with said chamber 29 through a port 36. The passageway 32 and the tunnel branch 35 are similar elements at opposite ends of the furnace, and parallel; the passageway, tunnel and branch being provided for supplying combustion-supporting air preferably from a single source to the chambers 28 and 29 for delivery through the checkered walls into the combustion chambers, as will presently be described.

Located in each of the chambers 28 and 29 is a burner 37 comprising a manifold 38 to which fluid fuel such as oil or gas may be delivered through a supply pipe 39, and nozzles 40 leading from the manifold through the openings in the checkered wall for delivering the fluid fuel into the combustion chambers, the combustion-supporting air passing from the chambers 28 and 29 through the wall openings about the nozzles to mix with the delivered fluid in the mixing chambers 31 and provide a fuel mixture suitable for combustion within the combustion chambers.

Opening from the roof 12 of the still or heating chamber are vertical flues 41, 42 and 43, communicating with a central main flue 44 that extends outwardly and downwardly exteriorly to the furnace structure and communicates at a point substantially midway of the furnace length with a horizontal spent gas conduit 45 that extends longitudinally of the furnace and in one direction is extended beyond the furnace to a stack 46, the conduit communicating with similar fan housings 47 and 48, one adjacent each end of the furnace, which in turn communicate through similar passageways 49 adjacent each end of the furnace with the aforesaid spent gas channels 23 and 24, to conduct hot spent gases from the heating chamber to the mingling chamber portion of the central chamber. The fan housings are mounted on the conduit, fans 50 therein being rotatable on shafts 51 journaled in bearings 52 of the housings and bearings 53 on bases 54; laterally extended supports 55 being provided on the conduit for supporting the outer ends of the bases 54 on which motors 56 are also mounted, connected with the fans, the motors being actuatable to force the recirculation of spent gases. Dampers 57 are installed in the housings to control the flow of spent gases into the passageways 49 and spent gas channels 23 and 24.

Located in the extended end of the spent gas conduit 45, between the fan housing 47 and the stack, is a preheater 58 preferably comprising a closed, metallic housing 59 within which are positioned through tubes 60 for conducting spent gases through the housing 59 to the stack. Opening to one end of the housing 59 is a duct 61 for admitting fresh air to the housing to pass over the tubes 60, and opening from the other end of the housing is a duct 62 through which fresh air, admitted through the duct 61, after being heated by convection from the tubes 60, is delivered to the passageway 32 and tunnel 34 for delivery to the air chamber 28 from the passageway, and to the air chamber 29 from the tunnel and branch, and thence to the mixing chambers 31. A baffle plate 63 is provided in the housing 59 to conduct and spread the air over the tubes. An impeller fan 64 is provided for forcing air through the preheater to the mixing chambers.

The still for which the elements described are provided is illustrated as of the type having banks of tubes arranged in series, such as 65 and 66, and extending horizontally through the heating chamber longitudinally thereof, and provided with suitable fittings 67 and 68 extending exteriorly to the furnace walls, the upper series 66 being separated from the lower series 65 by the checkered arch 69. The series are connected for flow of oil from one to the other, and the upper series 66 communicates through its fittings with a source of oil, the lower series communicating with and delivering heated oil to reaction or other elements of a distilling apparatus not shown.

The furnace structure will include platforms 70 and 71 for access to the tubes, sight openings, manholes, and other suitable elements in accordance with ordinary practice but which will not be described in detail as they form no part of the present invention.

Other elements may be installed, to aid in convenient operation of the apparatus, and for control of the air and gas conduits, such, for example, as dampers 72 in the spent gas conduit in front of the fan housings whereby entrance of gas from the conduit to a fan housing may be shut off and regulated.

In the operation of the furnace constructed as described, the fluid fuel element, oil or gas, is delivered through the burners into the combustion chambers, and fresh air is forced through the preheater, passageways and tunnel to and through the checkered walls about the burner nozzles into the mixing chambers for mixing with the fuel element to provide a combustible fuel mixture. The mixture passes into the combustion chambers where, the mixture being ignited, substantially complete combustion takes place.

The products of combustion are conducted through the lower portion of the central chamber and thence into the upper or heating portion thereof into heating contact with the tubes; thence outwardly through the flues in the roof of the heating chamber to the main flue and thence to the spent gas conduit having portions extending parallel with the furnace, one of which portions leads to the outlet stack. Some of the gases are drawn by suction of the circulating fans into each of the spent gas return channels, under regulated control by the dampers, and are impelled by the fans through the passageways and channels and through the spent gas return throats into the lower or mingling chamber portion of the central chamber where they mingle with the fresh products of combustion, which enter said portion subsequently to combustion.

The temperature of the spent gases is raised to a desired degree by contact with the fresh products of combustion, and a proper volume of heating medium is provided by the addition of the inert spent gases to the fresh products of combustion for passing to the heating chamber for most effective and economical use of the fuel mixture in heating the oil within the still tubes. Furthermore, practically complete combustion of the fuel mixture having been accomplished in the combustion chambers, there are only relatively small amounts of oxygen, if any, remaining uncombined among the fresh products of combustion, and such amounts of free oxygen as may be passed into the mingling chamber are substantially diluted in the relatively large volume of heating medium provided for by the introduction of the inert gases into the mingling chamber; the result being that oxidation of the still tubes is prevented, without interfering with complete combustion of the fuel mixture.

The circulating fans are adjusted to draw into the return channels the quantity of spent gases required for mingling properly with the fresh products of combustion under known fuel supply conditions, to maintain a constant desired volume and quality of heating medium for supply to the still chamber. Surplus of spent gases over such required quantity passes through the extension of the conduit, and therefore through the tubes of the preheater, to the stack. The fresh air forced into and through the preheater housing is heated by the gas-heated tubes and thereby conditioned for combustion service. The heated air, in turn, passing over the manifolds in the air chambers, raises the temperature of the fluid fuel element in the manifolds so that the fuel is delivered to the mixing chambers at a temperature and in condition for mixing readily with the combustion-supporting air and for complete combustion of the mixture within the combustion chambers.

It is apparent, therefore, that I have provided for recirculation of spent gases through the furnace chambers without dilution of the fuel prior to combustion of the mixture, and for such combination of spent gases with fresh products of combustion that the requisite volume of heating medium will be maintained for efficient and economical use of fuel to heat adequately the still contents, and for the prevention of an oversupply of oxygen in the heating medium, which might cause oxygenation of the fuel tubes.

What I claim and desire to secure by Letters Patent is:

1. A furnace of the character described including a single vertical chamber, including an upper tube heating portion and a lower gas mingling portion, a checkered arch in said tube heating portion, horizontal combustion chambers communicating with opposite ends of the gas mingling portion of the vertical chamber, mixing chambers at the outer ends of the combustion chambers, means for delivering atmospheric air and a hydrocarbon fuel element to said mixing chambers, channels opening to the mingling portion of the vertical chamber beneath the outlets of the combustion chambers, a stack, a conduit communicating with said stack and with said channels, a flue communicating with the top of said vertical chamber and with said conduit, and means for impelling spent gases from said conduit through said channels.

2. A furnace of the character described including a single vertical chamber, including an upper tube heating portion and a lower gas mingling portion, a checkered arch located in said tube heating portion, horizontal combustion chambers communicating with opposite ends of the gas mingling portion of the vertical chamber, mixing chambers at the outer ends of the combustion chambers, means for delivering atmospheric air and a hydrocarbon fuel element to said mixing chambers, channels opening to the mingling portion of the vertical chamber beneath the outlets of the combustion chambers, a stack, a conduit communicating with said stack and with said channels, a main flue leading to said conduit, a plurality of auxiliary flues leading from the top of the vertical chamber to the main flue, and means for impelling spent gases from said conduit through said channels.

3. A furnace of the character described including a single vertical chamber including an upper tube heating portion having a checkered arch therein and a lower gas mingling portion, horizontal combustion chambers communicating with opposite ends of the gas mingling portion of the vertical chamber, mixing chambers at the outer ends of the combustion chambers, means for delivering atmospheric air and a hydrocarbon fuel element to said mixing chambers, channels opening to the mingling portion of the vertical chamber beneath the outlets of the combustion chambers, a stack, a conduit communicating with said stack and with said channels, a flue communicating with the top of said vertical chamber and with said conduit, and means for impelling spent gases from said conduit through said channels, the outlets from said channels being located beneath the inner ends of the roof members of the combustion chambers.

4. A furnace of the character described including a single vertical chamber, including an upper tube heating portion and a lower gas mingling portion, horizontal combustion chambers communicating with opposite ends of the gas mingling portion of the vertical chamber, mixing chambers at the outer ends of the combustion chambers, means for delivering atmospheric air and a hydrocarbon fuel element to said mixing chambers, channels opening to the mingling portion of the vertical chamber beneath the outlets of the combustion chambers, a stack, a conduit communicating with said stack and with said channels, a flue communicating with the top of said vertical chamber and with said conduit, and means for impelling spent gases from said conduit through said channels, the floors of the combustion chambers constituting roofs for said channels providing horizontal outlets for the channels.

5. A furnace of the character described including a single vertical chamber, including an upper tube heating portion and a lower gas mingling portion, horizontal combustion chambers communicating with opposite ends of the gas mingling portion of the vertical chamber, mixing chambers at the outer ends of the combustion chambers, means for delivering atmospheric air and a hydrocarbon fuel element to said mixing chambers, channels opening to the mingling portion of the vertical chamber beneath the outlets of the combustion chambers, a stack, a conduit communicating with said stack and with said channels, a main flue leading to said conduit, a plurality of auxiliary flues leading from the top of the vertical chamber to the main flue, and means for impelling spent gases from said conduit through said channels, the floors of the combustion chambers constituting roofs for the channels and said floors terminating outwardly of the roofs of the combustion chambers to provide horizontal outlets for the channels, whereby gases delivered from the channels may mingle with fresh products of combustion prior to their delivery into the vertical chamber.

6. In a furnace of the character described, a single vertical chamber including an upper tube heating portion and a lower gas mingling portion, an above-ground conduit alongside and exterior to said chamber, a stack leading from said conduit, a flue leading from the top of said chamber to the conduit, channels leading from said conduit adjacent opposite ends of said chamber, combustion chambers at opposite ends of said vertical chamber including roof and floor members, the floor members extended over said channels to form the roofs thereof and terminating above the floor of said vertical chamber and outwardly of the inner ends of the combustion chamber to provide horizontal outlets for said channels beneath the inner ends of the combustion chambers, arches at the outer ends of the combustion chambers, checkered walls beneath said arches forming mixing and air chambers, nozzles in said air chambers for directing the hydrocarbon fuel element through said checkered walls, an air tunnel in the lower portion of said vertical chamber having branches communicating with said air chambers for supplying air for combustion through said checkered walls, a pre-heater in said spent gas conduit communicating with atmospheric air and with said air tunnel, and means for impelling air through the pre-heater to said tunnel.

7. In a furnace of the character described, a vertical chamber including an upper tube heating portion and a lower gas mingling portion, banks of tubes located in said heating portion, a checkered arch between adjacent banks of tubes, a conduit along the exterior of said chamber, a stack connected to said conduit, a flue connecting the top of said chamber to said conduit, channels leading from said conduit adjacent opposite ends of said chamber, combustion chambers at opposite ends of said vertical chamber including roof and floor members, said floor members extending over the channels and forming roofs therefor, and terminating above the floor of the vertical chamber and to provide outlets for said channels beneath the inner ends of the combustion chambers, arches at the outer ends of the combustion chambers, checkers forming air and mixing chambers located beneath said arches, nozzles in said air chambers for directing a fluid fuel through said checkers, and means for supplying air to said air chambers for passage through said checkers to support combustion.

8. In a furnace of the character described, a vertical chamber including an upper tube heating portion and a lower gas mingling portion, spaced banks of horizontal tubes located in said tube heating portion, a checkered arch located in said tube heating portion between adjacent banks, a conduit alongside and exterior of said vertical chamber, a flue connecting the top of said chamber with said conduit, channels connecting opposite ends of said chamber with said conduit, combustion chambers at opposite ends of said vertical chamber and including roof and floor members, said floor members extending over said channels forming roofs therefor and to form horizontal outlets for said channels, arches located within and at the outer ends of the combustion chambers, checker walls beneath said arches forming mixing and air chambers respectively, an air tunnel extending along the lower portion of said vertical chamber and having branches for supplying air for combustion through said checkered walls, means including a preheater for supplying preheated air under pressure to said tunnel, means for introducing fuel through said checker walls, and a stack connected with said first mentioned conduit.

In testimony whereof I affix my signature.

WARD T. BARKER.